United States Patent Office 3,766,188
Patented Oct. 16, 1973

3,766,188
CARBONYLDIOXYMORPHINAN DERIVATIVES
Masuo Murakami and Noriyoshi Inukai, Tokyo, and Noriaki Nagano, Ageo, Japan, assignors to Yamanouchi Pharmaceutical Co., Ltd., Tokyo, Japan
No Drawing. Filed June 28, 1971, Ser. No. 157,765
Int. Cl. C07d 43/28
U.S. Cl. 260—285     5 Claims

ABSTRACT OF THE DISCLOSURE

A novel carbonyldioxymorphinan derivative represented by the general formula

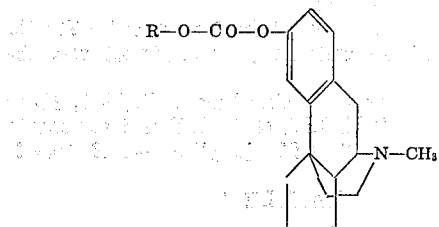

wherein R represents methyl, ethyl or an N-methylmorphinan-3-yl group and an acid addition salt thereof. These compounds have an excellent antitussive activity.

DETAILED EXPLANATION OF THE INVENTION

The present invention relates to novel carbonyldioxymorphinan derivative and a nontoxic acid addition salts thereof. More particularly, the invention relates to novel carbonyldioxymorphinan derivatives represented by the general formula

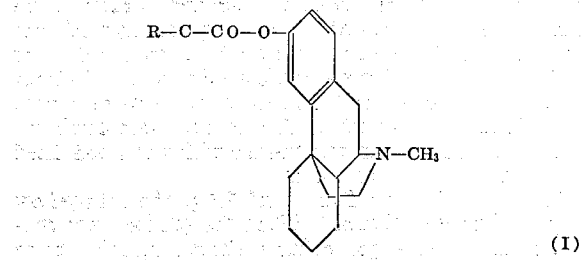

wherein R represents a methyl, ethyl or N-methylmorphinan-3-yl group and nontoxic acid addition salts thereof.

The compounds of this invention are novel compounds characterized by excellent antitussive activity. Also, the compounds of this invention have a lower toxicity and a broader safety margin than those of d-3-methoxy-N-methylmorphinan (general name: dextromethorphan) and codeine phosphate, which are known antitussive agents. In particular, the d-isomers of this invention do not form a physical dependence and hence are particularly valuable as antitussive agents.

The compounds of this invention as represented by the General Formula I above may be prepared by reacting 3-hydroxy-N-methylmorphinan and a carbonyl halide compound represented by the formula $$R'-CO-X \qquad (II)$$

wherein X represents a halogen atom and R' represents a lower alkoxy group or a halogen atom.

More particularly, the compounds of this invention represented by the General Formula I in which R is a lower alkyl group are prepared by reacting 3-hydroxy-N-methylmorphinan and an equimolar or an excessive molar amount of the carbonyl halide compound represented by the General Formula II in which R' is a lower alkoxy group in an organic solvent such as chloroform, tetrahydrofuran or the like, preferably, in the presence of a base such as triethylamine, potassium carbonate, sodium carbonate or the like. Also, other compounds of this invention represented by the General Formula I in which R is a N-methylmorphinan-3-yl group are prepared by reacting 3-hydroxy-N-methylmorphinan and an excessive amount of the carbonyl dihalide compound represented by the General Formula II in which R' is a halogen atom, in an organic solvent such as chloroform, tetrahydrofuran, or the like. The reactions proceed sufficiently at room temperature.

The product can be isolated from the reaction mixture by an ordinary separation procedure such as extraction. If necessary, the product may be purified by recrystallization, column chromatography, etc.

The acid addition salts of the present products are obtained by treating said products with a pharmaceutically nontoxic inorganic acid such as hydrochloric acid, hydrobromic acid, phosphoric acid, or sulfuric acid or a pharmaceutically nontoxic organic acid such as acetic acid or tartaric acid by conventional procedures.

One of the starting materials, 3-hydroxy-N-methylmorphinan may be the d-isomer, the l-isomer or a mixture thereof.

The antitussive activity and the toxicity of d-N,N'-dimethyl - 3,3' - (carbonyldioxy)dimorphinan·hydrochloride, which is one of the compounds of this invention were compared with those of dextromethorphan·hydrobromide and codeine phosphate in the following Experiment 1.

Experiment 1

The antitussive activity was tested by an electrical stimulation method (see; Naunyn-Schmiedeberg's Arch. Pharmakol. Exptl. Pathol., 215, 19 (1952)) as follows: The test sample was administered to a cat having a weight of 2.5–3.5 kg. by intravenous injection, the cat was then electrically stimulated after 10 minutes, the inhibition percentage was calculated from the reduction of the amplitude (intensity) of cough, and then the $ED_{50}$ (mg./kg.) was calculated from the reaction of the amount of the test sample and the inhibition percent.

The toxicity was tested by the Kärber method (see; Arch. Exptl. Pathol. Pharmakol., 162, 482–483, (1931)) as follows: The test compound was administered to a ICR-JCL mouse of six weeks old by subcutaneous injection, the mortality rate after 7 days was observed, and $LD_{50}$ (mg./kg.) was calculated from the relation of the amount of the test sample used and the mortality rate.

The results are shown in Table I.

TABLE I

| Test sample | $ED_{50}$ | $LD_{50}$ | Safety margin ($LD_{50}/ED_{50}$) |
|---|---|---|---|
| d-N,N'-dimethyl-3,3'-(carbonyldioxy)-dimorphinanhydrochloride | 2.45 | 405 | 165 |
| Dextromethorphan·hydrobromide | 2.33 | 150 | 64 |
| Codeine phosphate | 1.59 | 183 | 115 |

Then, the formation of physical dependence of d-N,N'-dimethyl - 3,3' - (carbonyldioxy)dimorphinan·hydrochloride, which is one of the compounds of this invention, was compared with that of codeine phosphate in the following Experiment 2.

Experiment 2

According to the Hosoya et al. method (see; Folia Pharmacol. Japan, 54, 120 (1958)), the test sample was administered intraperitoneally to a rat continuously for 2 months in a constant amount daily or twice a day while increasing the amount day by day. During the test, the administration of the test sample was interrupted and a physiological saline solution and a levallorphan which is a narcotic antagonist were administered for the test sample; thereafter the occurrences of abstinence syndromes such as the reduction in weight, abnormal behavior, etc., were observed and the formation of physical dependence was tested. The results are shown in the following table.

TABLE II

| Test sample | Amount (mg./kg./day) | | Abstinence syndrome | |
|---|---|---|---|---|
| | (A) | (B) | (C) | (D) |
| d-N,N'-dimethyl-3,3'-(carbonyldioxy) dimorphinan·hydrochloride. | 50 | 30–60 | None | None. |
| Codeine phosphate | 40 | 20–80 | Observed. | Observed. |
| Physiological saline solution (control). | | | None | None. |

NOTE.—(A)=Amount administered constantly; (B)=Amount increased day by day; (C)=Reduction in weight; and (D)=Abnormal behavior.

As is clear from the above table, codeine phosphate formed a physical dependence but $d$-N,N'-dimethyl-3,3'-(carbonyldioxy)dimorphinan formed no physical dependence.

The compounds of this invention may be administered orally in the form of a tablet, capsule, powder, syrup, etc., or may be administerd parenterally as by intramuscular injection, subcutaneous injection, etc., and the clinical dose for an adult is 30–150 mg. per day in the case of oral administration, which is usually administered 3–4 times daily, while the dose is 5–15 mg. per day in the case of parenteral administration, which is administered 1–2 times daily. The clinical dose is properly adjusted according to the condition of the patients, their age, etc.

EXAMPLE 1

$d$-N,N' - dimethyl - 3,3'-(carbonyldioxy)dimorphinan: In a mixture of 2.5 ml. of tetrahydrofuran and 4 ml. of chloroform was dissolved 0.45 g. of $d$-3-hydroxy-N-methylmorphinan and while stirring the solution, phosgene was introduced into the solution for about 30 minutes, whereby the temperature of the reaction mixture rose to 40–50° C. After stirring the system further for one hour, the pH of the solution was adjusted to 10 by the addition of 2 normal aqueous sodium hydroxide solution accompanied by cooling with ice. The oily product thus formed was extracted with 50 ml. of ether, washed with water and dried over anhydrous potassium carbonate. By distilling off the ether, the desired product was obtained as a colorless oily material with a yield of 0.54 g.

Elemental analysis.—Calculated for $C_{35}H_{44}N_2O_3 \cdot 2H_2O$ (percent): C, 72.88; H, 8.39; N, 4.86. Found (percent): C, 72.71; H, 8.33; N, 4.51. $[\alpha]_D^{20}$= +42.5 (c.=2, methanol).

Furthermore, by treating the product with 1 normal aqueous hydrochloric acid solution saturated with chloroform, acicular crystals of the hydrochloride of $d$-N,N'-dimethyl - 3,3' - (carbonyldioxy)dimorphinan having a melting point of 240° C. (decomposed) were obtained. $[\alpha]_D^{23}$= +21.7 (c.=1, methanol).

EXAMPLE 2

$dl$ - N,N' - dimethyl-3,3'-(carbonyldioxy)dimorphinan: Following the same procedure as Example 1 using $dl$-3-hydroxy-N-methylmorphinan instead of $d$-3-hydroxy-N-methylmorphinan, the desired material was obtained as a colorless oily material. The yield for the product was 0.54 g.

Elementary analysis.—Calculated for $C_{35}H_{44}N_2O_3 \cdot H_2O$ (percent): C, 75.24; H, 8.30; N, 5.01. Found (percent): C, 75.15; H, 8.22; N, 5.01.

EXAMPLE 3

$l$ - N,N' - dimethyl-3,3'-(carbonyldioxy)dimorphinan: In a mixture of 24 ml. of tetrahydrofuran and 13 ml. of chloroform was dissolved 1.7 g. of $l$-3-hydroxyN-methylmorphinan and then, while stirring the solution, phosgene was introduced into the solution for about 30 minutes. After further stirring for one hour, the reaction product liquid was concentrated and the residue obtained was dissolved in chloroform. After washing the solution with 5% aqueous sodium carbonate solution and water successively, the solution was dried over anhydrous sodium sulfate. When the chloroform was distilled off, 1.75 g. of the desired product (tri-hydrate) was obtained as a white caramel-like material.

Elemental analysis.—Calculated: for $C_{35}H_{44}N_2O_3 \cdot 3H_2O$ (percent): C, 70.67; H, 8.47; N, 4.71. Found (percent): C, 70.98; H, 7.83; N, 4.63.

When the product was dried for 6 hours at 70–75° C., a white caramel-like material (mono-hydrate) was obtained.

Elemental analylsis.—Calculated for $C_{35}H_{44}N_2O_3 \cdot 3H_2O$ (percent): C, 75.24; H, 8.30; N, 5.01. Found (percent): C, 75.97; H, 8.35; N, 4.95. $[\alpha]_D^{20}$= —54.8 (c.=1, methanol).

EXAMPLE 4

$d$ - 3 - ethoxycarbonyloxy-N-methylmorphinan: In 30 ml. of anhydrous tetrahydrofuran was dissolved 2.0 g. of $d$-3-hydroxy-N-methylmorphinan and then 1.3 g. of anhydrous potassium carbonate was suspended in the solution thus obtained. When a solution of 1.2 g. of ethyl chlorocarbonate in 5 ml. of anhydrous tetrahydrofuran was added dropwise to the suspension over a period of about 30 minutes while stirring the system, a crystalline deposit was immediately formed. After stirring the system overnight, the solvent was distilled off and the residue was mixed with 50 ml. of ether and 50 ml. of water followed by stirring sufficiently. Then, the ether layer formed was recovered by decantation and extracted three times with 10 ml. each of 1 normal aqueous hydrochloric acid solution. The extracts were combined with each other and the mixed solution was made alkaline with anhydrous potassium carbonate and then extracted twice each time with 50 ml. each of ether. The extracts were combined and the mixed solution was washed with water and dried over anhydrous sodium sulfate.

When the ether was distilled off, 2.5 g. of a light-yellow oily product was obtained. When the produce was subjected to a silica gel column chromatography using methanol as an eluant, the desired product was obtained as a light-yellow oily material.

Elementary analysis.—Calculated for $C_{20}H_{27}NO_3$ (percent): C, 72.92; H, 8.26; N, 4.25. Found (percent): C, 72.39; H, 8.25; N, 4.21. $[\alpha]_D^{15}$= +51.5 (c.=0.75, methanol).

EXAMPLE 5.—PREPARATION OF TABLETS

| | G. |
|---|---|
| $d$- N,N' - dimethyl - 3,3' - (carbonyldioxy)dimorphinan | 1.0 |
| Lactose | 10.0 |
| Starch | 3.5 |
| Talc | 0.5 |

A mixture of the above composition was pressed into 100 tablets using a 7.0 mm. flat punch. They may be coated according to a conventional method, if desired.

EXAMPLE 6.—PREPARATION OF INJECTIONS

In 100 ml. of saline solution were dissolved 0.5 g. of $d$-N,N'-dimethyl - 3,3' - (carbonyldioxy)dimorphinan, and the solution thus obtained was aseptically divided by 1 ml. into ampoules each containing 5 mg. of the active compound.

What is claimed is:
1. A carbonyldioxymorphinan compound represented by the formula

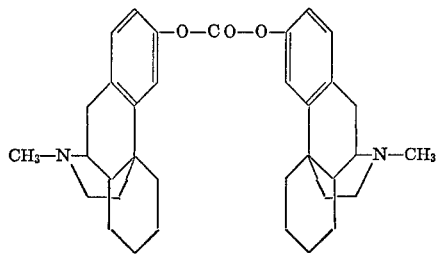

and its non-toxic acid addition salts.
2. A carbonyldioxymorphinan according to claim 1 which is *d*-N,N'-dimethyl - 3,3' - (carbonyldioxy)dimorphinan and its nontoxic acid addition salts.
3. A carbonyldioxymorphinan according to claim 1 which is *d*-N,N'-dimethyl - 3,3' - (carbonyldioxy)dimorphinan hydrochloride.
4. A carbonyldioxymorphinan according to claim 1 which is *dl*-N,N'-dimethyl - 3,3' - (carbonyldioxy)dimorphinan and its nontoxic acid addition salts.
5. A carbonyldioxymorphinan according to claim 1 which is *l*-N,N'-dimethyl - 3,3' - (carbonyldioxy)dimorphinan and its nontoxic acid addition salts.

References Cited
UNITED STATES PATENTS

| | | | |
|---|---|---|---|
| 3,474,101 | 10/1969 | Bentley et al. | 260—285 |
| 2,524,856 | 10/1950 | Schnider | 260—285 |
| 2,821,531 | 1/1958 | Brown | 260—285 |

DONALD G. DAUS, Primary Examiner

U.S. Cl. X.R.

424—260